March 29, 1927. 1,622,494
L. C. CRANSTON
CONTAINER FOR TRANSPORTING HOT FOOD
Filed Nov. 2, 1925  2 Sheets-Sheet 1

INVENTOR.
Louie Collier Cranston
BY
ATTORNEY.

March 29, 1927. 1,622,494
L. C. CRANSTON
CONTAINER FOR TRANSPORTING HOT FOOD
Filed Nov. 2, 1925   2 Sheets-Sheet 2
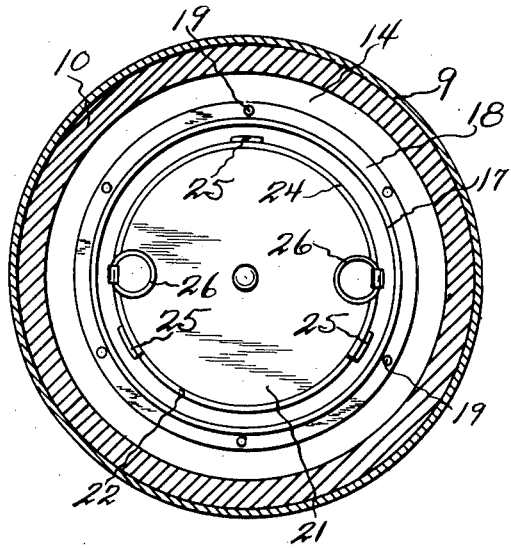
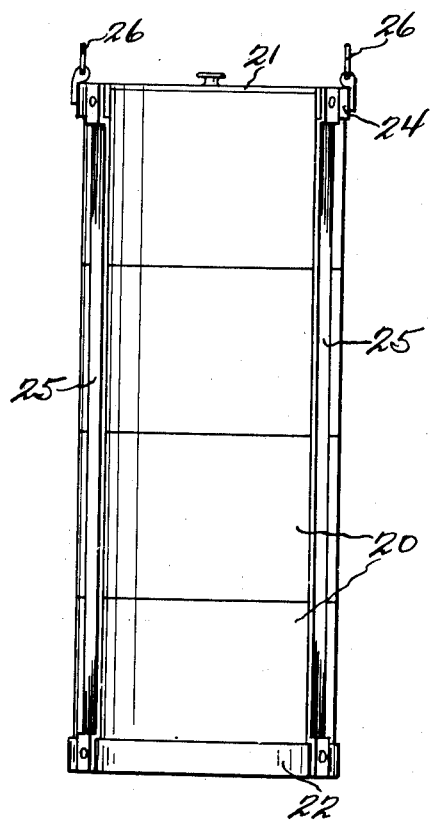
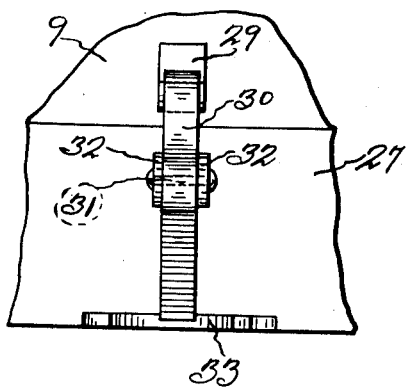
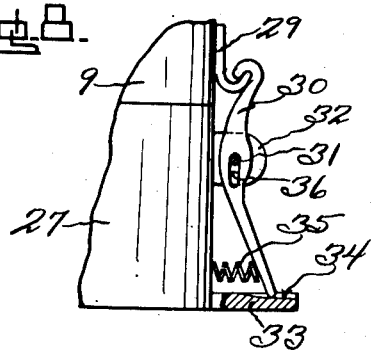
INVENTOR.
Louie Collier Cranston
BY
ATTORNEY.

Patented Mar. 29, 1927.

1,622,494

UNITED STATES PATENT OFFICE.

LOUIE COLLIER CRANSTON, OF KANSAS CITY, MISSOURI.

CONTAINER FOR TRANSPORTING HOT FOOD.

Application filed November 2, 1925. Serial No. 66,259.

This invention relates to novelly constructed containers especially adapted for transporting hot foods from their place of preparation to the consumer, and is designed particularly for use by catering companies who carry on the business of sending hot meals to parties some distance from their kitchens.

It is the primary object of the present invention to provide a simple and extremely efficient container for food transporting purposes which is cheap to make, not hard to keep clean and sanitary, and from which the consumer may easily remove the stack of food containers with the slightest inconvenience.

A still further object of this invention is the contemplation of an effective clamping means for removably securing a separate heating member to the main receptacle of the device whereby the same may be rigidly held in place by the feet of the user simultaneously with the actuating of the clamps.

An even further object of the present invention is the provision of a rack for the stack of food containers which may be used in removing the entire stack as a unit, and which is also so constructed that the successive containers may be lifted therefrom without interference.

Many minor objects will appear during the course of the specification referring to the accompanying drawing, illustrating but one form of the invention, and wherein:
Figure 1 is a side elevation of a food container made in accordance with this invention.

Fig. 5 is an enlarged horizontal section taken on line V—V of Fig. 2.

Fig. 6 illustrates the stack of nested food containers and lifting rack entirely removed from the device, and, Figs. 7 and 8 are enlarged detail views of the clamping device used to retain the underlying heating means in place.

Figure 1:
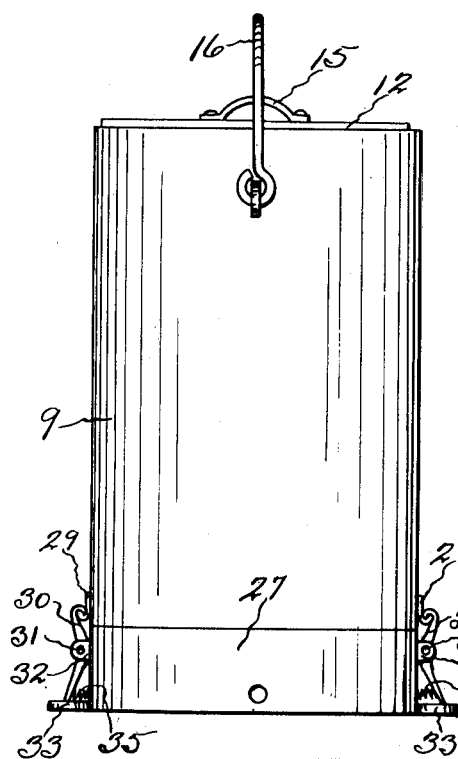

Referring at this time to the drawings in detail, wherein similar reference characters refer to like parts throughout the several views, the numeral 9 designates the main receptacle which is preferably cylindrical in shape, having its vertical sides only lined with asbestos or analogous heat retaining substance 10 and having a lid 12 similarly lined as at 13 whereby heat passing up through the unlined bottom 14 is effectively retained within the receptacle.

The lid 12 may have a suitable handle 15, and a bail 16 may be employed to afford a means of carrying the device.

A cylindrical wall 17, having an annular flange 18 at the bottom thereof is supported by bottom 14 inside the receptacle 9, and retained in spaced relation to the insulated walls thereof by rivets or similar means 19. This wall 17 forms an open top receptacle which is closed when lid 12 is in place.

Figure 2:
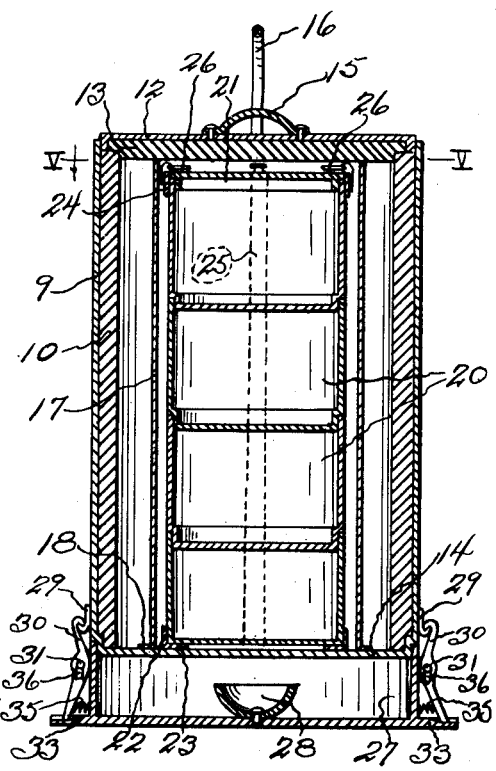
Fig. 2 is a vertical central section through the same.
Figure 3:
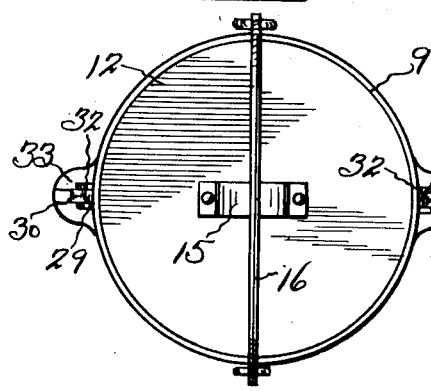
Fig. 3 is a plan view.
Figure 4:
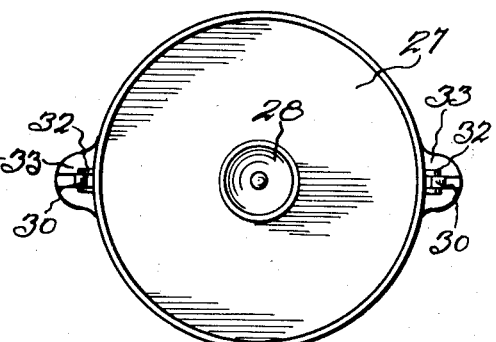
Fig. 4 is a plan view of the attachable heating means removed from the main receptacle.

A plurality of food containers 20, nested as shown in Fig. 2 to form a stack with the topmost container closed by a lid 21, are used to hold the various kinds of foods to be transported, and a rack, is supplied to maintain the containers in the nested position as well as to afford means for conveniently removing the same when the food is delivered.

This rack consists of a lower ring 22 which has an inturned flange 23 to bear the weight of all containers 20. An upper ring 24 extends but part way around and is joined to lower ring 22 by vertical bars 25 which should be offset to present an inner surface on the same plane as the inner surface of each ring 22 and 24. It is preferred to construct the rack by using three bars 25 and having one diametrically opposite the center of the cut away portion of the upper ring 24. Ring 24 carries a pair of oppositely disposed lifting handles 26 which may be folded down when the lid is in place.

When the stack of food containers 20 is removed from the main receptacle, each successive container from the top down may be grasped and lifted upwardly from the rack by allowing the hand and wrist to pass through that space provided by the cut away portion of ring 24.

To constantly heat the many food containers and the food therein as they are being transported, a removable member 27 of a diameter equal to that of the main receptacle is provided which carries a cup or similar holder 28 to be filled with fuel to be burned, such as charcoal. The novel means of removably clamping member 27 in place comprises a hook 29, carried by receptacle 9, which is engaged by a clamping member 30 pivotally supported intermediate its ends by a pin 31, held in place by outstanding ears 32 rigid with member 27. The upper end of member 30 is hooked to engage hook 29 as shown in Fig. 8, and the lower end thereof extends downwardly into a slight groove formed in radially disposed lug 33 beneath each clamp member 30. An inclined surface or cam surface 34 is formed by lug 33, and the lower end of member 30 rests upon the lowermost point thereof when the members are interlocked. A small spring 35 may be used to yieldably maintain member 30 in position.

To unlock the clamp, it is preferred to use the foot. By stepping upon the outer exposed portion of each lug 33, and pushing inwardly against lower end of member 30, spring 35 yields, inclined surface 34 pushes upwardly and slot 36 permits member 30 to slide upwardly and pivot around pin 31 to a point where its upper hooked end is out of engagement with member 29. While the removable member 27 is held in position against the floor, main receptacle 9 may be lifted off. The clamp will automatically snap into the locked position when receptacle 9 is replaced.

The operation of the device has been made clear throughout the specification, and it is obvious that it may be used to a great advantage in carrying on the business of transporting hot foods to persons in hotels or rooming houses from a kitchen located some distance therefrom.

What I claim and desire to secure by Letters Patent is:

1. In a device of the character described, a main receptacle having an open top and an integral closed bottom, a lid for said open top, said lid and the side walls only of said receptacle being lined with heat retaining substance, means within said main receptacle for maintaining a stack of food containers spaced apart from said walls, and heating means attachable beneath the bottom of said main receptacle, said spacing means comprising an annular continuous wall supported and retained in spaced relation by attachment to the bottom of said main receptacle and having its upper end closed by said insulated lid, said spacing wall providing a dead air space adjacent said heat retaining lining.

2. In a container for transporting hot food, a main receptacle having an open top and an integral closed bottom, a lid for said open top, said lid and the side walls only of said receptacle being lined with heat retaining substance, an annular continuous wall attached to and supported on said bottom, said wall extending upwardly to a point adjacent said lid and spaced from the sides of said receptacle to form a dead air space, a stack of food containers supported on said bottom and held spaced from the sides of said receptacle by said annular wall, a compartment located below said closed bottom and adapted to hold a heating means and quick detachable means for connecting said receptacle and compartment.

In testimony whereof I hereunto affix my signature.

LOUIE COLLIER CRANSTON.